United States Patent

[11] 3,590,650

| [72] | Inventor | Lester G. Rollins |
| | | 650 Forest Lane, Franklin, Pa. 16323 |
| [21] | Appl. No. | 812,759 |
| [22] | Filed | Apr. 2, 1969 |
| [45] | Patented | July 6, 1971 |

[54] CUTTER CHAIN
9 Claims, 6 Drawing Figs.

| [52] | U.S. Cl. | 74/254 |
| [51] | Int. Cl. | F16g 13/04 |
| [50] | Field of Search | 74/250, 251, 254 |

[56] References Cited
UNITED STATES PATENTS

| 2,788,670 | 4/1957 | Bruestle | 74/251 |
| 2,956,442 | 10/1960 | Krekeler | 74/254 |

*Primary Examiner*—C. J. Husar
*Attorney*—E. Wallace Breisch

ABSTRACT: A cutter chain employing pintless having noncircular end portions providing nonrotative retention of the pintless in the cutter-carrying links and a central portion recessed along one side to allow space for greater than normal sprocket tooth size relative to a given pitch length.

PATENTED JUL-6 1971 3,590,650

INVENTOR.
Lester G. Rollins.

CUTTER CHAIN

The present invention relates to cutter chains such as those used in coal cutters and ripper chain mining machines, which chains are made up of a plurality of saddle-type bit-carrying links alternating with and connected together by insertion-type connector links. All of said links are flexibly attached to adjacent links by pintles nonrotatively held in a bit link and rotatively engaged by adjacent connector links. The cutter chains of this invention are quite similar to those shown and described in U.S. Pat. No. 2,956,442 (Krekler).

The cutter chain of this invention is of novel design giving rise to the following advantages:

The bit links are provided with noncircular holes to prevent rotation of pintles therein characterized by a D-shaped cross section wherein the flat surface of the D-shaped end portions is connected to a generally circular surface by portions of shorter radius and the generally cylindrical surface and the short radius curvature portions of these holes are located to reduce or eliminate the bad effects of stress concentration caused by the presence of such short radius curvature;

the pintle of this invention is provided with a recessed bearing surface in its central portion wherein this recessed surface is confined to one side of the pintle which one side is the same side as the flat surface of the end portions of the pintle resulting in the central section having increased strength due to greater section modulus than was available in prior art pintles where the flat surface was along the opposite side of the pintle from the recessed surface.

These and other advantages and objects of this invention will become more readily apparent upon consideration of the following description and drawings in which.

Figure 3:
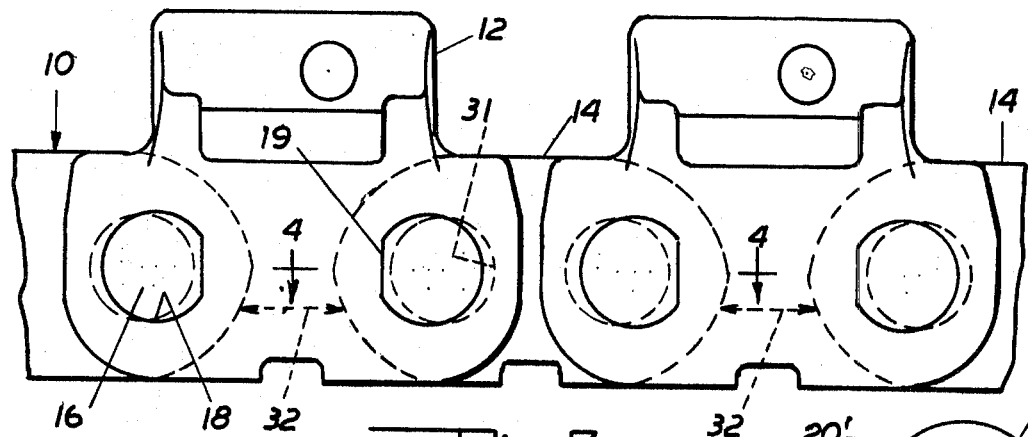
FIG. 3 is a smaller scale side elevational view of a portion of a cutter chain constructed according to the principles of this invention.
Figure 4:
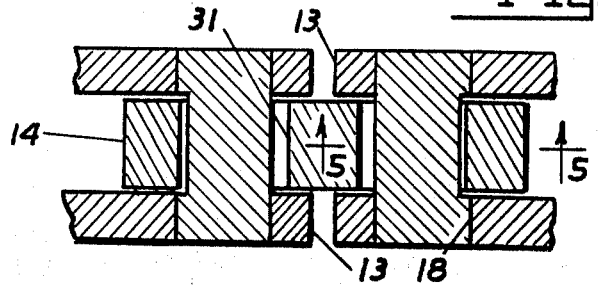
FIG. 4 is a sectional view taken substantially on line 4–4 of FIG. 3.

Referring now to the drawings, FIG. 3 shows a portion of cutter chain 10 comprising a plurality of saddle-type cutter bit links 12 and single-cheek connector links 14 flexibly fastened together by pintles 16 to form a flexible chain in a manner well known in the art. The bit links 12 are provided with bit-receiving sockets (not shown) and suitable bit-fastening means such as setscrew (also not shown) in a well-known manner. The bit links 12 are of a saddle type having at each end thereof a pair of cheeks 13 spaced apart to receive one end of a connector 14 between the cheeks 13 at either end of the bit link 12.

The pair of cheeks 13 at one end of a bit link 12 have respective coaxial openings 18 therein of noncircular outline shown as D-shaped (i.e. of generally circular cross section with a chordal line forming one side with a flat surface 19 on the side of each opening nearest the transverse centerline of the respective link and facing the flat portion 19 of the opening 18 in the other end of the link 12. With the openings 18 thus oriented each of the relatively small radius curves at the intersections of the flat surface 19 with the arcuate surface of the opening 18 is located in a part of the link well spaced from the edge of the link. With the short radius curvature so located the stress concentration due to the short radius is unlikely to be damaging (i.e. cause the formation of cracks) as has been known to happen where the short radius curvature is located near the edge of the link in prior art structures employing D-shaped openings.

Extending from the cheek openings 18, and slidably received therein, are the pintles 16 having D-shaped end portions 20 comprising major surface portions 20' circularly cylindrical in nature combined with flat surface portions 21 so that the end portions 20 are of the same shape as the cheek openings 18 and the pintles 16 are nonrotatively held by the cheeks 13 due to the noncircular nature of the cheek openings 18 and the end portions 20 of the pintles 16. The cylindrical surface portions 20' have a common axis 16' which contains the centers of their circular cross section, which axis 16' is considered to be the central axis of the pintle 16.

Figure 1:
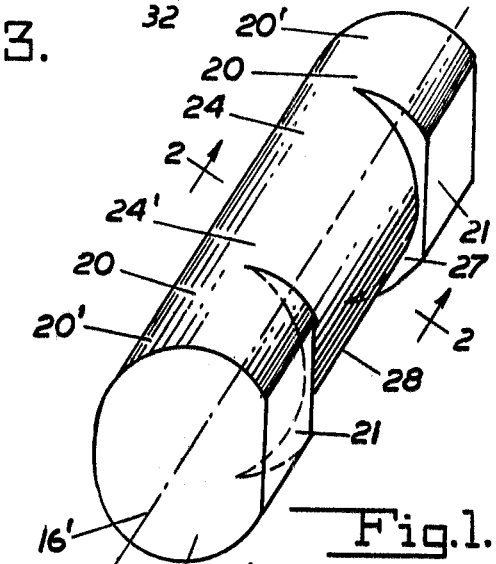
FIG. 1 is a three-dimensional oblique view at approximately full size of a pintle constructed according to the principles of this invention.
Figure 2:
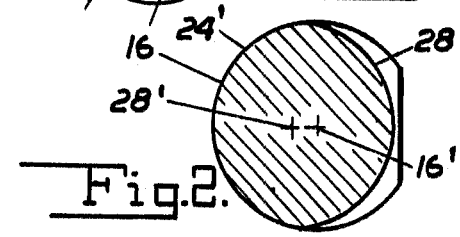
FIG. 2 is a sectional view taken substantially on line 2–2 of FIG. 1.
Figure 5:
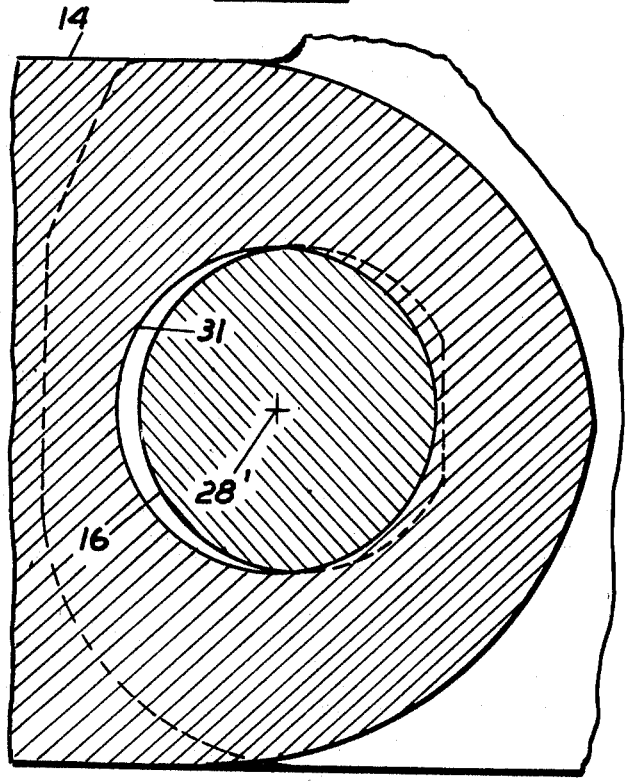
FIG. 5 is an enlarged fragmentary sectional view taken substantially on line 5–5 of FIG. 4.

A central portion 24 of the pintle 16 extending between the above-described end portions 20 has two surface portions as hereinafter described. A surface portion 24' amounting to approximately one-half of the surface of the central portion 24 (to the left as seen in FIGS. 1 and 2) is simply a coaxial continuation of the circular portion 20' of the end portions 20 earlier described. The second portion of the surface of the central portion 24 is a recessed curved portion of approximately semicircular outline having a radius slightly smaller than the radius of the circular portion 20' and an axis indicated as 28' in FIG. 2 parallel to axis 16' but spaced to the left of axis 16' as seen in FIGS. 2 and 5. This formation of a recessed surface 28 develops inwardly facing shoulders 27 between the end surface portions 20' and the recessed surface 28.

Each end of the connector 14 is provided with a circular bore 31 of substantially the same diameter as the circular portion 20' of the end portions 20 but enough larger to provide clearance for a sliding fit of the end portion 20 through the connector bore 31. Thus, when the connector end is between the cheeks 13 with bore 31 aligned with the openings 18, the pintle 16 can be inserted through one of the openings 18, through the connector bore 31 and through the other opening 18 to assemble a connector line 14 with a bit line 12 in a well-known manner. Once this assembly has been accomplished normal tension of the chain, wherever installed, will cause connector 14 to move to the left as seen in FIG. 5, bringing the connector 14 and the pintle 16 into the relationship there shown. The axial length of the recessed surface portion 28 being slightly greater than the thickness of the connector 14 will allow the connector 14 to move into the position shown.

As seen in FIG. 5 the connector bore 31 will fit the right-hand half of the pintle central surface portion 24 (recessed surface 28) in a position substantially to the left of the position afforded by nonrecessed pintles of the prior art. Such movement increases the distance, shown at 32 in FIG. 3, between ends of adjacent connector links. This increase in the space 32 allows for larger sprocket tooth dimensions for a given pitch chain than with a straight pintle and is one of the advantages of the recessed pintles.

Figure 6:
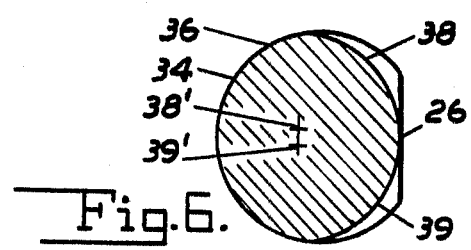
FIG. 6 is a sectional view similar to FIG. 2 but showing a second embodiment of the principles of this invention.

FIG. 6 shows a second embodiment 36 of the pintle of this invention wherein the recessed portion is still on the same side as the flat portion of the pintle 36 but in this case the recessed central surface is divided into three portions two of which are cylindrical surfaces 38 and 39 on separate axes 38' and 39' and the third portion of the surface is a narrow flat surface 26 which is an extension of the flats 21 across the central section 34 of the pintle 36 between the surfaces 38 and 39 all as described in copending applications Ser. No. 812,758 filed Apr. 2, 1969 (McDowell) and Ser. No. 812,760 filed Apr. 2, 1969 (Mitchell), respectively, which applications are assigned to the same assignee as is this application.

With pintles such as pintle 36 using the details from either or both of the above-cited applications the principles of this invention are being applied and additional benefits accrue from the improved conformation of the central portion 24 of the pintle 36.

It is to be noted that with either the pintle 16 or the pintle 36 the placing of the flat on the same side of the pin as the recess preserves a large portion of the tension surface 24' or 34 of the pintle 16 or 36 in a fully circular form so that the center portion has a much improved section modulus over the flatsurfaced pintles of prior art recessed on the opposite side as shown in the above-cited U.S. patent. It is to be particularly appreciated that for beam strength the fibers of material most remote from the central axis of the elements are most important in contributing to the strength of the element. It is exactly these fibers most remote in the direction of greatest stress which are removed in flattening the pintle side opposite from the recess as was done in the prior art. A further weakening of the prior art pintle results from using a flat relatively rough milled surface of the tension side as compared to the rounded, smooth ground tension surface 24' or 34 of the pintles 16 or 36 of this invention.

Preferred embodiments of this invention having been hereinabove described it is to be realized that the variations in the application of the principles of this invention can be applied without departing from the scope of this disclosure. It is therefore respectfully requested that this invention be interpreted as broadly as possible.

What I claim is:

1. A cutter chain made up of alternate saddle-type cutter bit links and insertion-type connector links flexibly joined in overlapping straddling relationship by pintles inserted through aligned openings in the overlapped end portions of said links, the improvement comprising: each of said pintles having axially spaced end portions and a central portion intermediate said end portions; said intermediate portion having a recessed exterior surface extending axially thereof along one side thereof; said recessed exterior surface being cylindrical; each of said end portions having a cylindrical portion greater than 180° of the periphery thereof and a flat surface extending between the termini of said cylindrical portion; and said flat surfaces being on the same side of said pintle as said recessed exterior surface.

2. In a cutter chain as specified in claim 1 wherein in each of said pintles said flat surfaces lie in a common plane which extends generally parallel to the longitudinal axis of said pintle.

3. In a cutter chain as specified in claim 2 wherein said flat surfaces are spaced radially outwardly from the radially outermost extent of said recessed exterior surface.

4. In a cutter chain as specified in claim 3 wherein said common plane is parallel to a plane drawn tangentially to said outermost extent of said recessed exterior surface.

5. In a cutter chain as specified in claim 1 inserted through each set of said aligned openings in said overlapped end portions of said links.

6. A pintle comprising: a body member having axially spaced end portions and a central portion intermediate said end portions; said intermediate portion having a recessed exterior surface extending axially thereof along one side thereof; said recessed exterior surface being cylindrical; each of said end portions having a cylindrical portion greater than 180° of the periphery thereof and extending between the termini of said cylindrical portion; and said flat surfaces being on the same side of said pintle as said recessed exterior surface.

7. A pintle as specified in claim 6 wherein said flat surfaces lie in a common plane which extends generally parallel to the longitudinal axis of the pintle.

8. A pintle as specified in claim 7 wherein said flat surfaces are spaced radially outwardly from the radially outermost extent of said recessed exterior surface.

9. A pintle as specified in claim 8 wherein said common plane is parallel to a plane drawn tangentially to the radially outermost extend of said recessed exterior surface.